July 5, 1960
E. F. COLON
2,943,432
FRUIT GATHERING DEVICE
Filed May 6, 1958
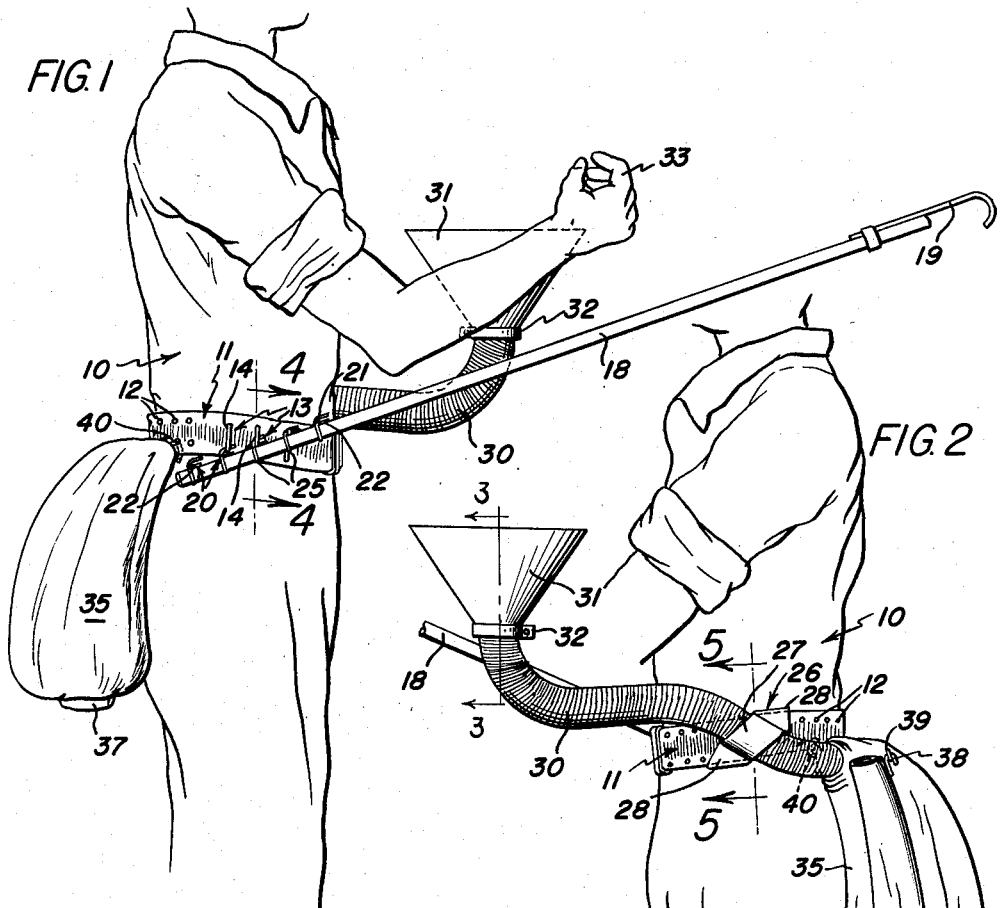
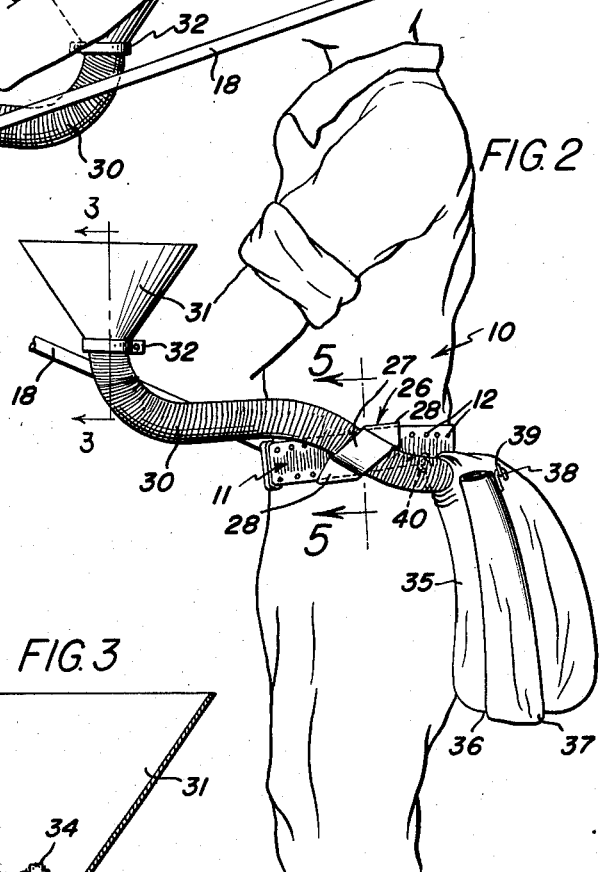
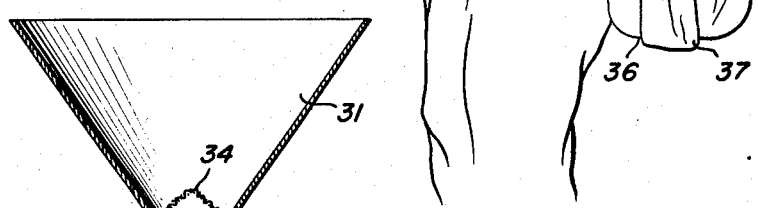
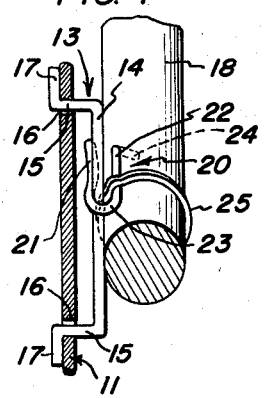
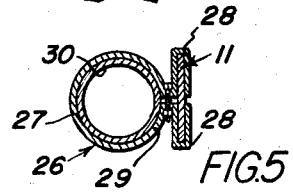
INVENTOR.
ERNESTO F. COLON
BY *Victor J. Evans & Co.*
ATTORNEYS

United States Patent Office 2,943,432
Patented July 5, 1960

2,943,432
FRUIT GATHERING DEVICE
Ernesto F. Colon, College Sta. Colegio Agricultura, Mayaguez, Puerto Rico
Filed May 6, 1958, Ser. No. 733,433
1 Claim. (Cl. 56—328)

This invention relates to a means for picking fruit such as coffee beans.

The object of the invention is to provide a means for facilitating the picking of coffee beans whereby the coffee beans or other fruit can be readily and conveniently hand picked from branches of a tree or bush, and wherein a means is provided for retaining the branch in close proximity to the picker so that the beans can be conveniently hand picked from the branch and then dropped into a funnel-shaped member whereby the beans will then pass through a conduit to a receptacle that is carried by the fruit picker, and wherein the receptacle can be readily emptied whenever desired.

A further object of the invention is to provide a fruit picker which is especially suitable for use in picking or harvesting coffee beans from coffee plants, and wherein there is provided a hook member which is mounted on the outer end of a rod, the hook member adapted to engage a branch which has the coffee beans thereon so that the branch can be held in a position that will permit the person to readily manually remove the coffee beans from the branch, and wherein there is arranged a convenient funnel-shaped member which is adapted to have the coffee beans dropped therein, the coffee beans falling or passing by gravity from the funnel-shaped member through a conduit to a suitable receptacle which can be emptied when desired into a larger basket or container.

A further object of the invention is to provide a fruit picker which is extremely simple and inexpensive to manufacture.

Other objects and advantages will be apparent during the course of the following description.

In the accompanying drawings, forming a part of this application, and in which like numerals are used to designate like parts throughout the same:

Figure 1 is an elevational view illustrating the fruit picker of the present invention.

Figure 2 is a view looking at the opposite side from Figure 1.

Figure 3 is an enlarged fragmentary sectional view on the line 3—3 of Fig. 2 illustrating the details of the funnel-shaped member and the screen or filter.

Figure 4 is an enlarged sectional view taken on the line 4—4 of Figure 1.

Figure 5 is an enlarged sectional view taken on the line 5—5 of Figure 2.

Referring in detail to the drawings, the numeral 10 indicates a person or picker which may be a person engaged in the picking of coffee beans or other fruit. The numeral 11 indicates a belt which is arranged around the waist of the person 10, and the belt 11 is provided with a plurality of spaced apart apertures or openings 12 that are positioned in that portion of the belt 11 that encircles the left side and the back of a person, Figures 1 and 2.

Connected to the belt 11 is a plurality of spaced apart brackets which are each indicated generally by the numeral 13, Figure 4. Each of the brackets 13 includes a first portion 14, and arranged at right angles with respect to the first portion 14 is a pair of spaced parallel second portions 15. The portions 15 extend through openings 16 in that portion of the belt 11 that encircles the right side of a person, and the portions 15 terminate in transverse or right angularly arranged third portions 17.

The numeral 18 indicates an elongated rod which has a hook member 19 on its outer end, and the hook member 19 is adapted to engage a branch of a tree or bush such as a branch having coffee beans growing therefrom.

There is further provided a plurality of spaced apart clamps which are indicated generally by the numeral 20, and each clamp 20 includes first and second spaced apart sections 21 and 22 which are interconnected by a curved section 23. A transverse finger 24 extends from the section 22, and the finger 24 is adapted to be embedded in or secured in the rod 18. The numeral 25 indicates bands which surround the rod 18, and the bands 25 are arranged in engagement with the sections 22 of the clamps 20 for retaining the clamps connected to the rod. It is to be noted that this arrangement permits the rod 18 to be connected to the belt 11 so that the rod 18 can be arranged at different positions as desired. In other words, by disengaging the clamps 20 from the brackets 13, the rod 18 can be arranged at different positions so as to permit the hook member 19 to reach or engage different branches of coffee plants, and when the clamps 20 engage certain of the brackets 13, the rod 18 will be maintained immobile in its desired position.

As shown in Figures 2 and 5, there is provided a support member which is indicated generally by the numeral 26, and the support member 26 includes a circular portion 27 which has gripping portions 28 that are arranged in engagement with the belt 11. The support member 26 has securing elements such as a bolt and nut assembly 29 arranged in engagement therewith, and the numeral 30 indicates a tube or conduit which extends through the circular portion 27 of the support member 26. The conduit 30 is adapted to be made of a suitable yieldable or flexible material so that it can be shifted to different positions as desired. A funnel-shaped member 31 is connected to the upper end of the conduit 30 by means of a clamp 32, and the member 31 is adapted to have coffee beans dropped or deposited therein as for example when such coffee beans are picked by the hands 33 of the person 10. A filter or screen 34 is arranged in the lower portion of the funnel-shaped member 31 whereby foreign matter will be separated from the coffee beans, and wherein the coffee beans can pass down by gravity through the conduit 30. The coffee beans which pass through the conduit 30 by gravity are received in a receptacle 35 which is connected to the lower end of the conduit 30. The receptacle or bag 35 has a discharge spout or neck 36 connected thereto. As shown in the drawings, one end of the spout 36 is connected to the bottom of the bag 35 as at 37. When the person is picking the coffee beans, the spout 36 is maintained in raised position by means of a hook 38 which engages a lug 39 on the upper portion of the receptacle or bag 35. Then, when the receptacle 35 is to be emptied, as for example when the coffee beans are to be discharged into a larger container or other receptacle, the hook 38 can be disengaged from the lug 39 so as to permit the coffee beans to empty out through the spout 36, as for example when the spout 36 is in lowered position. The bag or receptacle 35 is supended from or connected to the belt 11 by means of hooks 40 which are arranged in engagement with the openings 12 in the belt 11.

From the foregoing, it is apparent that there has been provided a means for picking fruit such as coffee beans. In use, with the parts arranged as shown in the drawings, the hook member 19 on the end of the rod 18 is adapted to be arranged in engagement with the branch of the tree or bush so that the branch with the coffee beans or other fruit thereon can be held in close proximity to the hands 33 of the picker 10. The other end of the rod 18 is connected to the belt 11 through the medium of the interengaging brackets 13 and clamps 20, and when it is desired to shift the position of the rod 18, the hooks or clamps 20 can be readily disengaged from the brackets 13 whereby the rod 18 can be positioned in any desired or convenient location. The bag 35 is suspended from the belt 11 by means of the hooks 40 which engage the openings 12. The funnel-shaped member 31 is connected to the upper end of the conduit 30 through the medium of the clamp 32. Thus, with the parts arranged as shown, it will be seen that the hook member 19 will hold the branch close to the picker 10 so that the person can use his or her hands 33 to pick the coffee beans and then these coffee beans are dropped into the funnel-shaped member 31. The filter 34 is of such a construction that coffee beans can pass down through the filter 34, but any foreign matter such as leaves, twigs, or the like are prevented from passing down through the filter 34. This foreign matter can be removed from the funnel-shaped member 31 in any suitable manner. The coffee beans which pass down through the filter or screen 34 pass by gravity through the conduit 30 and are collected in the receptacle 35. Normally while the receptacle 35 is being filled, the spout 36 is in the raised position shown in Figure 2, and the spout 36 is maintained in its upright or raised position by means of the hook 38 which engages the lug 39. However, when the bag 35 becomes filled, or when the bag or receptacle 35 is to be emptied into a basket or the like, the hook 38 is disengaged from the lug 39 so that the spout 36 can be moved downwardly from the position shown in Figure 2 whereby the coffee can pour down from the receptacle 35 out through the spout 36.

It is to be noted that the conduit 30 is of a material that can be bent or moved so that the funnel-shaped member 31 can be positioned at different locations. The conduit 30 is connected to the belt 11 through the medium of the support member 26.

The parts can be made of any suitable material and in different shapes or sizes.

The reach stick or rod 18 serves to bring the branches down near the operator, and the hook 19 is adapted to engage with the branch. With the hook 19 engaging the branch of the tree, and with the rod 18 connected to the belt 11 as shown in the drawings, both hands 33 are free to work simultaneously. The screen or filter 34 prevents leaves and the like from entering the conduit or tube 30. The conduit 30 is flexible but is of such a construction that it will remain stationary or immobile in its various adjusted positions. The bag 35 may be made of canvas or the like.

Thus, it will be seen that there has been provided an improved means for picking fruit and the funnel member 31 can be shifted with respect to the operator or with respect to the branch being worked on and the present invention permits both hands to work on the branch since the rod is attached to the belt on the operator. The rod 18 is used for pulling the branch having the fruit thereon, towards the operator and the branch will be locked or held in this position until released by the operator.

Heretofore the task or job of picking coffee beans from trees in mountainous and irregular terrain or level terrain has been very tedious and difficult. One method has been to grasp the tree branch which is very flexible with the left hand and pull the branch towards the operator and while the left hand is holding the branch the right hand is used to pick from each cluster all of the ripened beans. When the right hand is full of beans it moves down to a basket hanging in front of the operator which is waist high and this operation is repeated until all of the ripened beans have been picked from the particular branch and then the operator goes to the next branch and repeats the process, the green beans being left on the tree.

With the present invention this tedious work is greatly simplified and facilitated since the operator has the bag 35 hanging down from the belt 11 as shown in the drawings and this bag can be adjusted to different positions due to the plurality of spaced apart openings 12. The parts are made in lightweight material and the funnel 31 is arranged so that beans positioned therein are delivered by gravity into the bag 35 so that the loading of the bag or receptacle 35 is greatly simplified.

Minor changes in shape, size and rearrangement of details coming within the field of invention claimed may be resorted to in actual practice, if desired.

I claim:

In a device of the character described, a belt provided with a plurality of spaced apart openings therein, a plurality of spaced apart brackets connected to said belt, each of said brackets including a first portion, second portions extending at right angles from said first portion, said second portions extending through said belt and terminating in transverse third portions, an elongated rod having a hook member on its outer end for engagement with a branch of a tree having fruit thereon, a plurality of spaced apart clamps connected to the other end of said rod, each of said clamps including first and second sections interconnected together by a curved section, a transverse finger extending from said second section and said finger being secured to said rod, bands surrounding said rod and engaging said second sections, the first section of each of said clamps being adapted to selectively engage the first portion of each of said brackets so that said rod can be arranged at different positions with regard to said belt, a support member connected to said belt, a flexible conduit connected to said support member, a funnel-shaped member connected to the upper end of said conduit, a filter arranged in the lower portion of said funnel-shaped member, a receptacle connected to the other end of said conduit, hook members secured to said receptacle for connecting the receptacle to the openings in said belt, a discharge spout connected to the bottom of the receptacle, and a hook assembly cooperatively mounted on said bag and the discharge end of said spout for selectively retaining the discharge spout in raised position.

References Cited in the file of this patent

UNITED STATES PATENTS

| | | |
|---|---|---|
| 76,248 | Richardson | Mar. 31, 1868 |
| 705,365 | Law | July 22, 1902 |
| 1,170,960 | Canterbury | Feb. 8, 1916 |
| 2,685,773 | Dauenhauer | Aug. 10, 1954 |
| 2,770,937 | Huddle | Nov. 20, 1956 |